(12) United States Patent
Hsu et al.

(10) Patent No.: US 11,511,656 B2
(45) Date of Patent: Nov. 29, 2022

(54) CHILD RESTRAINT SYSTEM WITH SIDE IMPACT BUMPER

(71) Applicant: MONAHAN PRODUCTS, LLC, Rockland, MA (US)

(72) Inventors: Roger Hsu, Weymouth, MA (US); Mark Brian Finnestad, Franklin, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 0 days.

(21) Appl. No.: 17/210,707

(22) Filed: Mar. 24, 2021

(65) Prior Publication Data

US 2022/0305974 A1 Sep. 29, 2022

(51) Int. Cl.
| | | |
|---|---|---|
| *B60N 2/42* | (2006.01) | |
| *B60N 2/28* | (2006.01) | |
| *B60N 2/80* | (2018.01) | |
| *B60N 2/888* | (2018.01) | |

(52) U.S. Cl.
CPC ........ *B60N 2/888* (2018.02); *B60N 2002/899* (2018.02)

(58) Field of Classification Search
CPC .. B60N 2/2884; B60N 2/2851; B60N 2/2872; B60N 2/4235; B60N 2/888; B60N 2/26; B60N 2/42709; B60N 2002/899; B60R 2021/0006; B60R 21/2072
See application file for complete search history.

(56) References Cited

U.S. PATENT DOCUMENTS

| | | | | |
|---|---|---|---|---|
| 7,125,073 B2 * | 10/2006 | Yoshida | ............... | B60N 2/2812 297/216.11 |
| 7,232,182 B2 * | 6/2007 | Yoshida | ............... | B60N 2/2806 297/216.11 |
| 7,293,828 B2 * | 11/2007 | Yoshida | ............... | B60N 2/2851 280/730.1 |
| 7,959,223 B2 | 6/2011 | Marsden et al. | | |
| 8,038,209 B2 | 10/2011 | Marsden et al. | | |
| 8,056,971 B2 * | 11/2011 | Marsden | ................ | B60N 2/885 297/216.11 |
| 8,056,972 B2 * | 11/2011 | Marsden | .............. | B60N 2/2884 297/216.11 |
| 8,496,293 B2 * | 7/2013 | Gaudreau, Jr. | ...... | B60N 2/2872 297/216.11 |

(Continued)

FOREIGN PATENT DOCUMENTS

| | | |
|---|---|---|
| EP | 2368752 A2 | 9/2011 |
| EP | 2368753 A1 | 9/2011 |

(Continued)

OTHER PUBLICATIONS

International search Report and Written Opinion from corresponding PCT Application No. PCT/US2022/021534 dated Jun. 23, 2022.

*Primary Examiner* — Shin H Kim
(74) *Attorney, Agent, or Firm* — Lando & Anastasi, LLP (57) ABSTRACT

A child restraint system includes a shell including an aperture formed therein. The child restraint system further includes a head support member disposed with at least a portion of the shell. The child restraint system further includes a bumper configured to extend through the aperture and contact a part of the head support member when a force is applied to the bumper.

20 Claims, 5 Drawing Sheets

(56) References Cited

U.S. PATENT DOCUMENTS

| | | | |
|---|---|---|---|
| 9,174,555 B2 | 11/2015 | Rajasingham | |
| 9,211,820 B2* | 12/2015 | Allen | B60N 2/4235 |
| 9,908,444 B2* | 3/2018 | Haas | B60N 2/2884 |
| 10,118,510 B2* | 11/2018 | McRoberts | B60N 2/4235 |
| 10,500,990 B2* | 12/2019 | Cohen | B60N 2/286 |
| 10,807,721 B2* | 10/2020 | Bakhsh | B60N 2/005 |
| 10,829,013 B2* | 11/2020 | Cohen | B60N 2/2809 |
| 2002/0153753 A1* | 10/2002 | Kassai | B60N 2/806 |
| | | | 297/216.11 |
| 2009/0008913 A1* | 1/2009 | Breuninger | B60N 2/42736 |
| | | | 280/730.2 |
| 2010/0295344 A1 | 11/2010 | Marsden et al. | |
| 2010/0295347 A1 | 11/2010 | Marsden et al. | |
| 2011/0047685 A1 | 3/2011 | Ferrara | |
| 2014/0117729 A1* | 5/2014 | Allen | B60N 2/2821 |
| | | | 297/216.11 |
| 2016/0152164 A1* | 6/2016 | Hass | B60N 2/2866 |
| | | | 297/216.11 |
| 2016/0304004 A1* | 10/2016 | Sandbothe | B60N 2/286 |
| 2017/0065098 A1 | 3/2017 | Taylor et al. | |
| 2017/0151894 A1 | 6/2017 | McRoberts et al. | |
| 2017/0349065 A1* | 12/2017 | Pleiman | B60N 2/885 |
| 2020/0130848 A1* | 4/2020 | Bakhsh | B64D 11/062 |

FOREIGN PATENT DOCUMENTS

| | | | |
|---|---|---|---|
| EP | 2570299 A1 | 3/2013 | |
| EP | 2907692 A1 | 8/2015 | |
| GB | 2575642 A | 1/2020 | |
| WO | 2018109177 A1 | 6/2018 | |

* cited by examiner

CHILD RESTRAINT SYSTEM WITH SIDE IMPACT BUMPER

BACKGROUND

Aspects and embodiments of the present disclosure are directed generally to child restraint systems, for example, child car seats, and to a side impact protection mechanism for car seats.

SUMMARY

In accordance with some aspects of the present disclosure, there is provided a child restraint system. The child restraint system may include a shell including an upper portion and a lower portion. The upper portion of the shell may have an aperture formed therein. The child restraint system further may include a head support member disposed within at least a part of the upper portion. The child restraint system may include a bumper extending through the aperture in the upper portion.

In some embodiments, the bumper may be configured to contact a part of the head support member.

In some embodiments, the bumper embodies a rectangular-shaped cuboid in cross section. In some embodiments, the bumper includes a rigid material, a resilient material, a plastically deformable material, or a combination thereof. The bumper may have a length of about 3 inches to about 5 inches.

In some embodiments, the bumper is secured to the shell of the child restraint system. In particular embodiments, the bumper is secured to the shell by a component having at least one dimension greater than a dimension of the aperture of the shell. In further embodiments, the bumper is secured to the shell using a tether.

In some embodiments, the bumper includes an inner face and an outer face. The inner face may extend beyond an inner surface of the shell and the outer face may extend beyond an outer surface of the shell. In certain embodiments, the inner face and the outer face of the bumper may be connected by a shaft extending through the aperture. In some embodiments, the inner face of the bumper includes at least one linear dimension greater than the aperture of the shell.

In some embodiments, the inner face of the bumper protrudes about 0.5 inches to about 3 inches from the inner surface of the shell. In some embodiments, the inner face of the bumper is no more than about 0.2 inches from the head support member. In particular embodiments, the inner face of the bumper is not in contact with the portion of the head support member. In further embodiments, the outer face of the bumper may protrude about 1 inch to about 3 inches from the outer surface of the shell. The bumper may be configured to translate within the aperture of the shell to allow the inner face of the bumper to contact the head support member.

In some embodiments, the head support member may include wings disposed on opposing sides of a central portion, the wings having a front zone, a center zone, and a rear zone. The inner face of the bumper may be configured to contact any one of the front zone, center zone, and rear zone of one wing of the head support member. In further embodiments, the zone of the wing contactable by the inner face of the bumper may include a projection that substantially matches a profile of the inner face of the bumper.

In accordance with some aspects of the present disclosure, there is provided a child restraint system. The child restraint system may include a shell including an upper portion and a lower portion, the upper portion having an aperture formed therethrough. The child restraint system further may include a head support member disposed within the upper portion, the head support member including at least one wing. The child restraint system additionally may include a bumper disposed through the aperture and configured to contact a part of the at least one wing of the head support member.

In further embodiments, the bumper includes an inner face, an outer face, and shaft connecting the inner face to the outer face.

In accordance with some aspects of the present disclosure, there is provided a child restraint system. The child restraint system may include a shell including an aperture formed therein. The child restraint system further may include a head support member disposed within at least a portion of the shell. The child restraint system additionally may include a bumper configured to extend through the aperture and contact a part of the head support member when a force is applied to the bumper.

In further embodiments, the bumper may include an inner face, an outer face, and shaft connecting the inner face to the outer face.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A illustrates a front perspective view. FIG. 1B illustrates a rear perspective view;

FIGS. 3A and 3B illustrate top views showing various bumper positions in a child restraint system, according to some embodiments.

DETAILED DESCRIPTION

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Conventional seat belt systems in most motor vehicles are typically not appropriate for properly restraining infants or small children. Accordingly, parents or caregivers of infants or small children often transport the infants or small children in a child restraint system, commonly referred as a car seat or child vehicle safety seat, when travelling in a motor vehicle, the use of which is required by law for children below a certain age or weight in many jurisdictions. The child restraint system may be secured to the back seat of a motor vehicle with a seat belt, for example, a three-point safety belt and/or other connectors such as ISOFIX® connectors or LATCH® systems. The child restraint system may be padded with different forms of energy absorbing resilient materials, which may reduce forces that a child riding in the child restraint system may be exposed to during a motor vehicle collision. Conventional child restraint systems have proven highly effective in reducing injuries to children which may otherwise have been sustained as a result of a motor vehicle collision. It has been recognized, however, that the side impact protection offered by many conventional child restraint system may be inadequate or at least may be improved upon. Regulations setting forth standards for side impact protection in child restraint systems have recently been enacted in Europe and similar regulations are expected to be enacted in the United States of America.

Current solutions for side impact protection in conventional child restraint systems have been shown to be ineffective at reducing the forces exerted on a child during a side impact event, particularly on a child's head and neck region. In a typical side impact event, the impacted door of the car contacts the shell of the conventional child restraint system, transferring those forces directly to the child. Thus, even for current child restraint systems with side impact protection, there is an insufficient reduction in the forces transferred to the head and neck of the child secured in said system, thus leading to injury. Provision of adequate levels of side impact protection in child restraint systems to meet such regulations has thus become of increasing importance, and it is an object of the present disclosure to provide a child restraint system which overcomes some or all of the known shortcomings in currently available systems.

Aspects and embodiments disclosed herein include a child restraint system including a structural element constructed and arranged to provide for side impact protection. In accordance with an aspect, a child restraint system may include a shell having an aperture, a head support member disposed with at least a portion of the shell, and a bumper configured to extend through the aperture. The bumper may be configured to contact part of the head support member when a force is applied to the bumper. Some embodiments of the system may include a bumper of unitary, i.e., single-piece, construction. Further embodiments of the system may include a bumper constructed of multiple components, each component being dimensioned to permit the bumper to translate in the aperture without coming free from the aperture or the shell of the child restraint system.

Figure 1A:
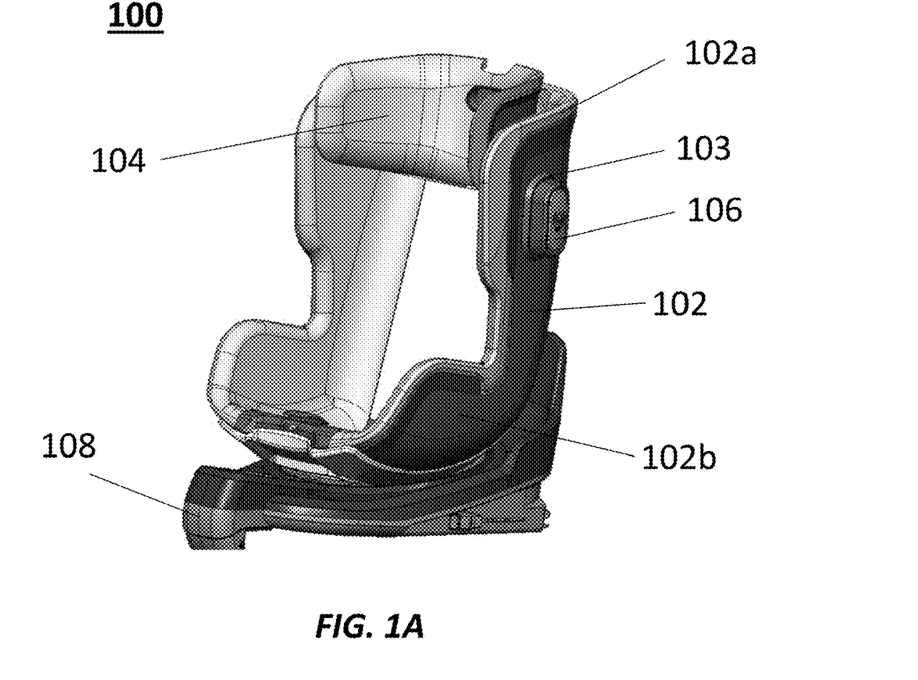
FIGS. 1A and 1B illustrate front and rear perspective views of a child restraint system, according to one embodiment.
Figure 1B:
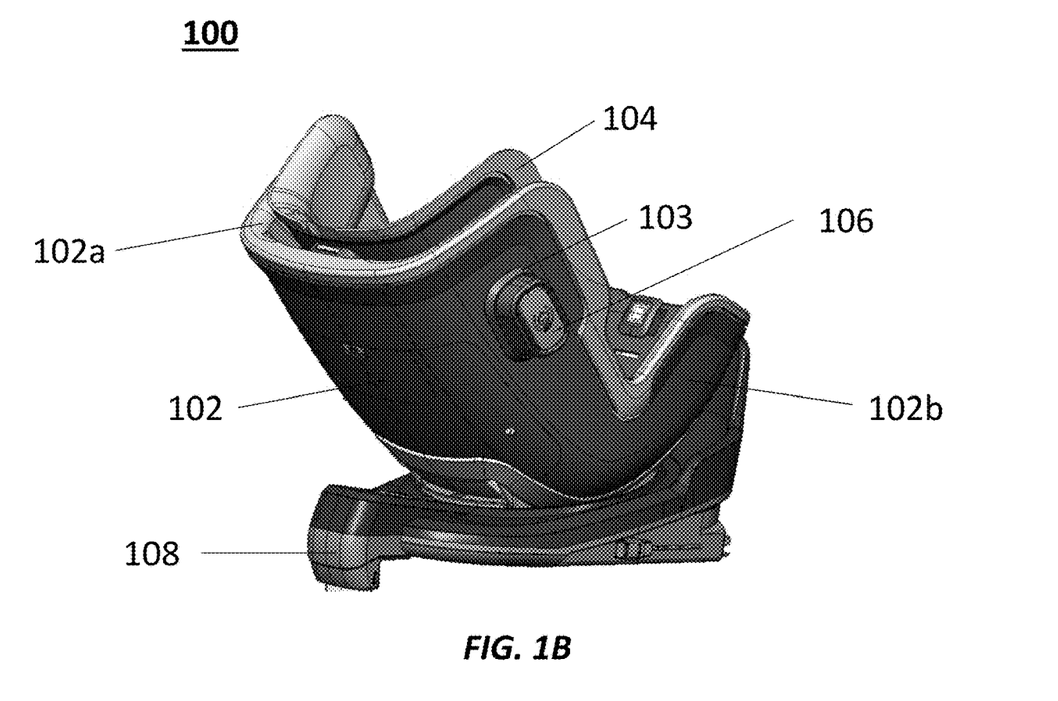

One embodiment of a child restraint system is illustrated in front and rear perspective views generally at 100 in FIGS. 1A and 1B, respectively. The child restraint system 100 may be a stand-alone device or may be configured to be secured to, for example, a stroller frame or to a separate vehicle seat base by the provision of appropriate securing mechanisms as are known in the art on, for example, a lower surface of the seat. The child restraint system 100 includes a shell 102, a head support member 104 disposed within a portion of the shell 102, and a bumper 106 extending through aperture 103 in the shell 102. In one embodiment, the bumper 106 extends through the aperture 103 formed on one side of the shell 102 to provide protection on that side of the shell 102, with a portion of the bumper extending from an outer surface of the shell 102. In this embodiment, the bumper 106 can be configured on a desired side of the shell 102 of the child restraint system 100.

The shell 102 may be defined into an upper portion 102a through which aperture 103 is located therethrough and a lower portion 102b. As further illustrated in FIGS. 1A and 1B, the child restraint system 100 may be a stand-alone device including a base 108 constructed and arranged to be connected to lower portion 102b of shell 102 and allow the child restraint system 100 to rotate around a general vertical axis defined by the upper portion 102a of shell 102 or recline along a general horizontal axis defined by the lower portion 102b of shell 102.

Without wishing to be bound by any particular theory, the portions of the bumper 106 extending from the shell 102 may be impacted during a motor vehicle impact, causing it to translate within the aperture 103. The translation of the bumper 106 transfers all or part of the force from the impact to the head support member 104 rather than to the shell 102 of the child restraint system. In this configuration, the head of the child positioned in the child restraint system 100 begins to slow down in the earlier stages of the impact, distributing the force and subsequent pressure on the head support member 104. This distribution of force and pressure reduces the buildup of energy before the impact reaches the head support member 104.

Figure 2:
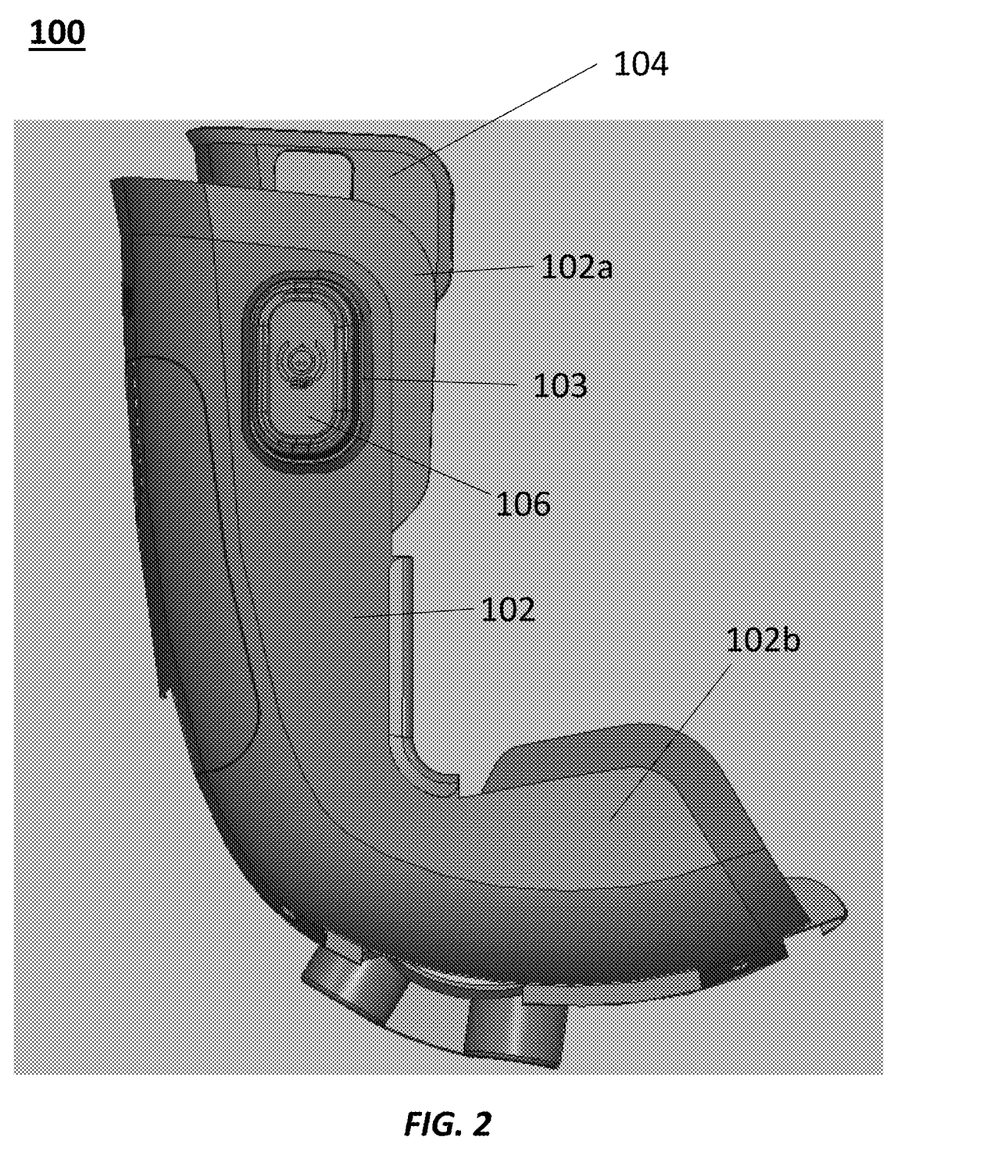
FIG. 2 illustrates a side view of the child restraint system illustrated in FIGS. 1A and 1B.

As illustrated in FIG. 1B, the shell 102 may generally have a U-shaped contour, e.g., including lateral sides that extend out and around the upper portion 102b of shell 102, to provide for partial side impact protection for a child positioned within the child restraint system 100. With reference to FIG. 2, the shell 102 may be generally J-shaped when viewed from the side to define a seat for a child with the upper portion 102a sized to accept the torso of a child and the lower portion 102b sized to accept the legs and lower back of a child. In some embodiments, head support member 104 may be adjustable along a generally vertical axis defined by the upper portion 102b of shell 102. The head support member 104 may thus be adjusted to accommodate children of different sizes such that the child's head is maintained in the correct position when the child is secured within the child restraint system 100. The shell 102 and head support member 104 may further include materials to provide for comfortable positioning of the child within the child restraint system 100. For example, one or both of the shell 102 and head support member 104 may include padding, e.g., resilient materials, e.g., closed or open cell foam, and any fabric coverings of the included padding. The shell 102 further may include securing elements, such as straps, clasps, or buckles, that provide the necessary connections for securing a child within the child restraint system 100 or for securing the child restraint system 100 to a vehicle seat.

In some embodiments, the aperture 103 through the shell may have any suitable size and shape to accommodate the bumper 106. In general, the dimensions, e.g., diameter, of the aperture are sized to permit the bumper 106 or a portion of the bumper 106 to pass through without binding or interference of the bumper with the portions of the shell 102 forming the aperture 103. In this configuration, the aperture 103 may have a largest dimension that is up to about 10% larger than an outer dimension of the bumper 106. For example, the aperture 103 may have a dimension that is about 10% larger, about 9% larger, about 8% larger, about 7% larger, about 6% larger, about 5% larger, about 4% larger, about 3% larger, about 2% larger, or about 1% larger, than the corresponding dimension of the bumper 106 or portion of the bumper 106 passing through the aperture 103.

In some embodiments, the aperture 103 may have an opening size of about 3 inches to about 5 inches. For example, the aperture may have an opening size of about 3 inches, about 3.25 inches, about 3.5 inches, about 3.75 inches, about 4 inches, about 4.25 inches, about 4.5 inches, about 4.75 inches, or about 5 inches.

In some embodiments, the aperture 103 and bumper 106 may be provided on both lateral sides of a child restraint 100, for example, as illustrated in FIGS. 1A (left lateral side) and 1B (right lateral side). In embodiments in which only a single bumper 106 is provided on a child restraint system 100, the child restraint system 100 should be positioned such that the bumper 106 faces a surface of the motor vehicle, for example, a door of the motor vehicle, that the child restraint system 100 is most likely to come into contact with upon the motor vehicle experiencing a side impact collision.

In some embodiments, the bumper 106 may include an outer face 106a and an inner face 106b. The outer face 106a may extend beyond an outer surface of the shell 102 and the inner face 106b may extend beyond an inner surface of the shell 102, e.g., towards the head support member 104. A bumper 106 of this configuration is illustrated in FIGS. 1A-5. In the illustrated configurations of FIGS. 3A-5, the child restraint system includes two bumpers 106, one on each lateral side of the child restraint system. For each bumper 106, the inner face 106b of the bumper 106, though protruding from the inner surface of the shell 102, is not in contact with the portion of the head support member 104. Upon a side impact collision, the protruding outer face 106a of the bumper 106 is contacted, causing the bumper 106 to translate. The translation of the bumper pushes the inner face 106b of the bumper 106 against the head support member 104. In some embodiments, the outer face 106a of the bumper 106 protrudes about 1 inch to about 3 inches from the outer surface of the shell 102. For example, the outer face 106a of the bumper 106 protrudes about 1 inch, about 1.25 inches, about 1.5 inches, about 1.75 inches, about 2 inches, about 2.25 inches, about 2.5 inches, about 2.75 inches, about 3 inches from the outer surface of the shell 102. In particular embodiments, the outer face 106a of the bumper 106 protrudes about 2 inches from the outer surface of the shell 102. In some embodiments, the inner face 106b of the bumper protrudes about 0.5 inches to about 3 inches from the inner surface of the shell 102. For example, inner face 106b of the bumper 106 protrudes about 0.5 inches, about 0.75 inches, about 1 inch, about 1.25 inches, about 1.5 inches, about 1.75 inches, about 2 inches, about 2.25 inches, about 2.5 inches, about 2.75 inches, or about 3 inches from the inner surface of the shell 102. In particular embodiments, the inner face 106b of the bumper 106 protrudes about 2 inches from the inner surface of the shell 102.

Figure 3A:
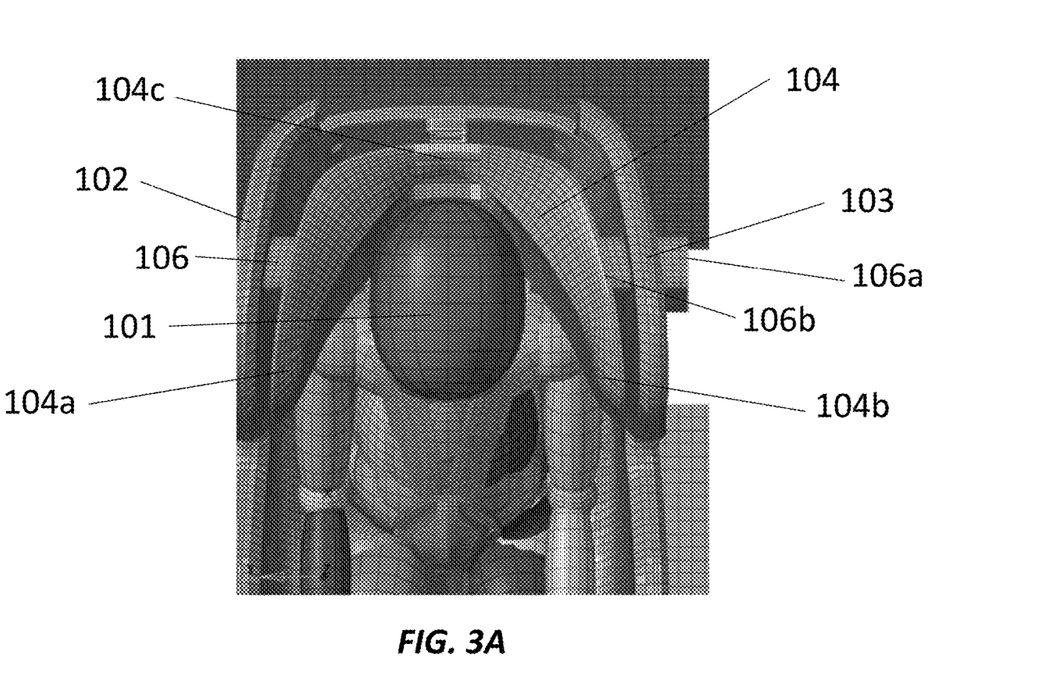
FIG. 3A illustrates a bumper positioned in a central zone of a head support member.
Figure 3B:
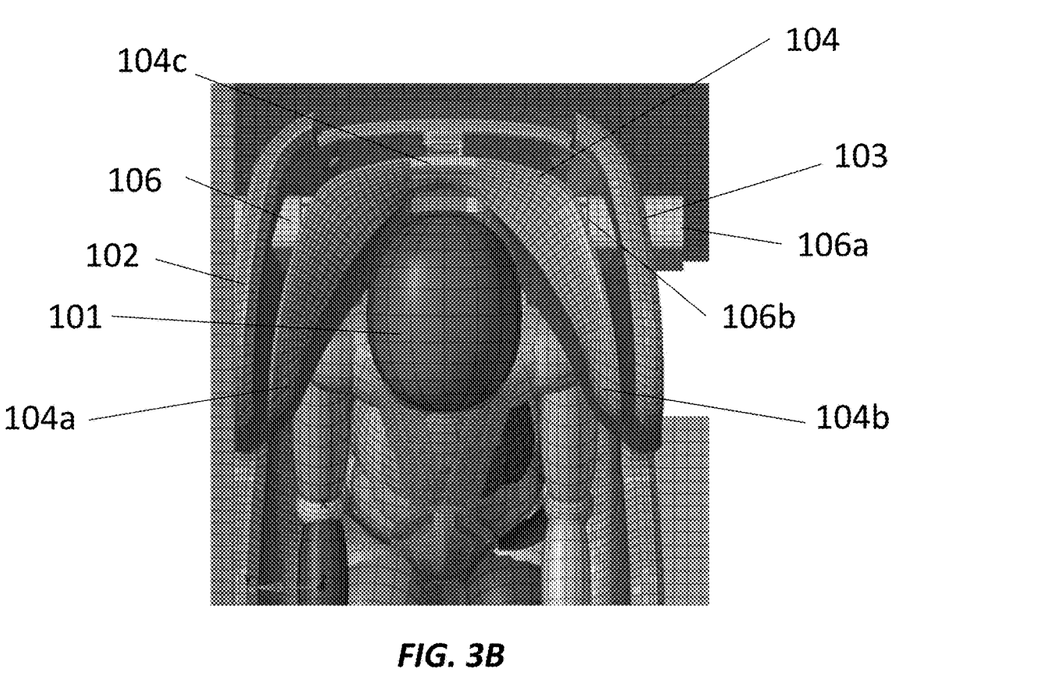
FIG. 3B illustrates a bumper positioned toward a rear zone of a head support member.

In some embodiments, the head support member 104 may include wings 104a, 104b disposed on opposing sides of a central portion 104c of the head support member 104. The wings 104a, 104b may be configured to be contacted by the bumper 106 during a side impact collision. As described herein, during a side impact, the outer face 106a of the bumper 106 may be contacted by a portion of the vehicle, causing it to translate within the aperture 103. The translation causes the inner face 106b of the bumper 106 to contact the wing 104a or 104b of the head support member 104. Each wing 104a, 104b may include a front zone, a center zone, and a rear zone, and the bumper 106 and aperture 103 may be substantially aligned with one or more zones of the wings 104a, 104b of the head support member 104. Embodiments where the bumper 106 is configured to contact different zones of the head support member 104 are illustrated in FIGS. 3A and 3B. With reference to FIG. 3A, the aperture 103 and bumper 106 are positioned such that the bumper 106 contacts a rear zone of the head support member, i.e., near the rear of the head of a child 101 positioned in the child restraint system 100. With reference to FIG. 3B, the aperture 103 and bumper 106 are positioned such that the bumper 106 contacts a center zone of the head support member 104, i.e., near the rear of the head of a child 101 positioned in the child restraint system 100. In some embodiments, the aperture 103 and bumper 106 are positioned such that the bumper 106 contacts a front zone of the head support member, i.e., near the front of the head of a child positioned in the child restraint system 100.

In some embodiments, the inner face of the bumper is no more than about 0.2 inches from the head support member. Without wishing to be bound by any particular theory, reducing the travel distance of the bumper before contact with the head support member reduces the force stack up on the head support member. Thus, in some embodiments, the inner face of the bumper is no more than about 0.05 inches, about 0.1 inches, about 0.15 inches, or about 0.2 inches from the head support member. Alternatively, the bumper in a rest position may be in contact with the head support member, i.e., 0 inches from the head support member. In this configuration, the bumper does not travel to contact the head support member when its opposing face is contacted during a side impact collision.

Figure 4:
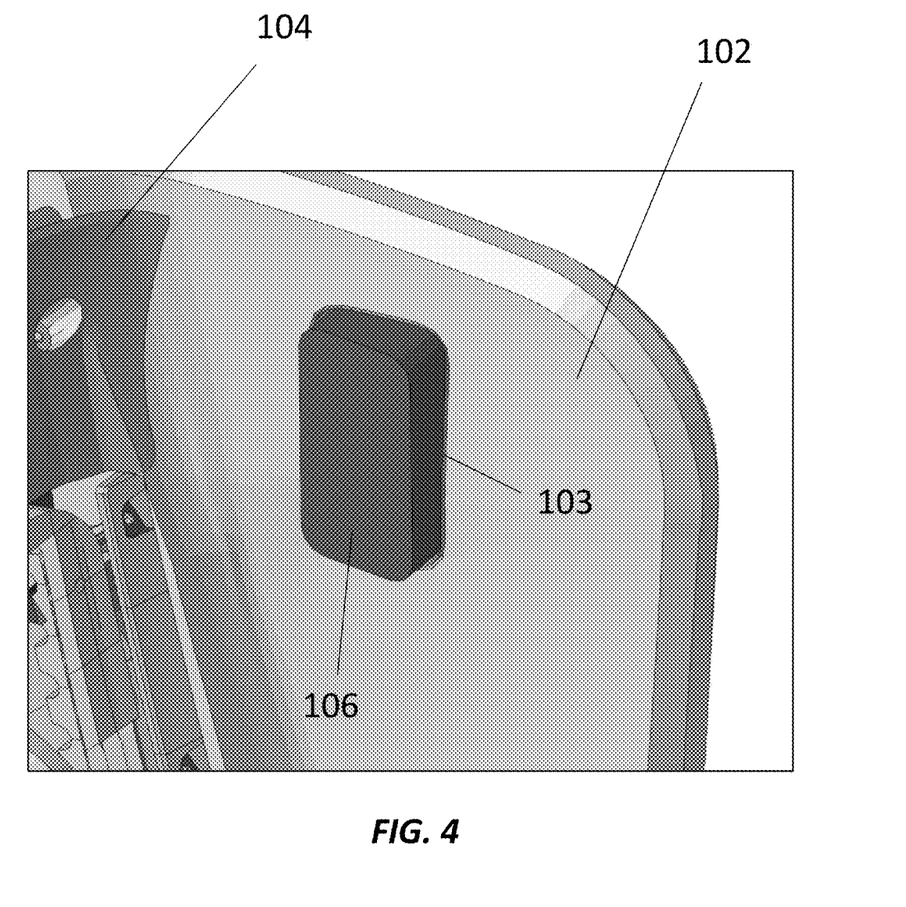
FIG. 4 illustrates an enlarged view of a bumper of a child restraint system, according to one embodiment.

The bumper 106 may be of any size and shape that permits contact with a part of the head support member 104 to distribute the forces applied to the bumper 106 during a side impact collision. As illustrated in FIGS. 1A-4, the bumper 106 may embody a rectangular cuboid shape in cross section having the long edge oriented along the vertical axis generally defined by the upper portion 102b of shell 102. Other shapes are possible, including but not limited to a prism, n-gon solid, e.g., a pentagonal cuboid, a cylinder, and an L-shaped solid, and this disclosure is not limited by the size and shape of the bumper 106. The shape of the bumper 106 may substantially correspond to the shape of the aperture 103 thorough the shell 102, such as illustrated in the simplified view of a bumper 106 extending through an aperture 103 in a shell 102 is illustrated in FIG. 4. In FIG. 4, the aperture 103 and the bumper 106 are substantially rectangular in shape such that the bumper 106, having smaller dimensions than the aperture 103, can translate through the aperture 103. In some embodiments, the bumper may have an overall length of about 3 inches to about 5 inches. For example, the bumper may have an overall length of about 3 inches, about 3.25 inches, about 3.5 inches, about 3.75 inches, about 4 inches, about 4.25 inches, about 4.5 inches, about 4.75 inches, or about 5 inches.

Bumpers 106 disclosed herein may be manufactured from any number of different materials. In some embodiments, the bumper 106 may be manufactured from a rigid material, a resilient material, a plastically deformable material, or a combination thereof. Rigid materials include, but are not limited to, rigid polymers, rigid polymer blends, e.g., rigid copolymers, or metals and metal alloys. Resilient materials may include, but are not limited to, paper stock, e.g., corrugated cardboard, polymeric foams, e.g., expanded polypropylene (EPP), polymer blends, and rubber, which have resilient properties varying with material composition. A bumper 106 may be manufactured from a single material. Alternatively, a bumper 106 may be manufactured from combination of one or more materials, and different materials may be selected for different locations on the bumper 106.

Figure 5:
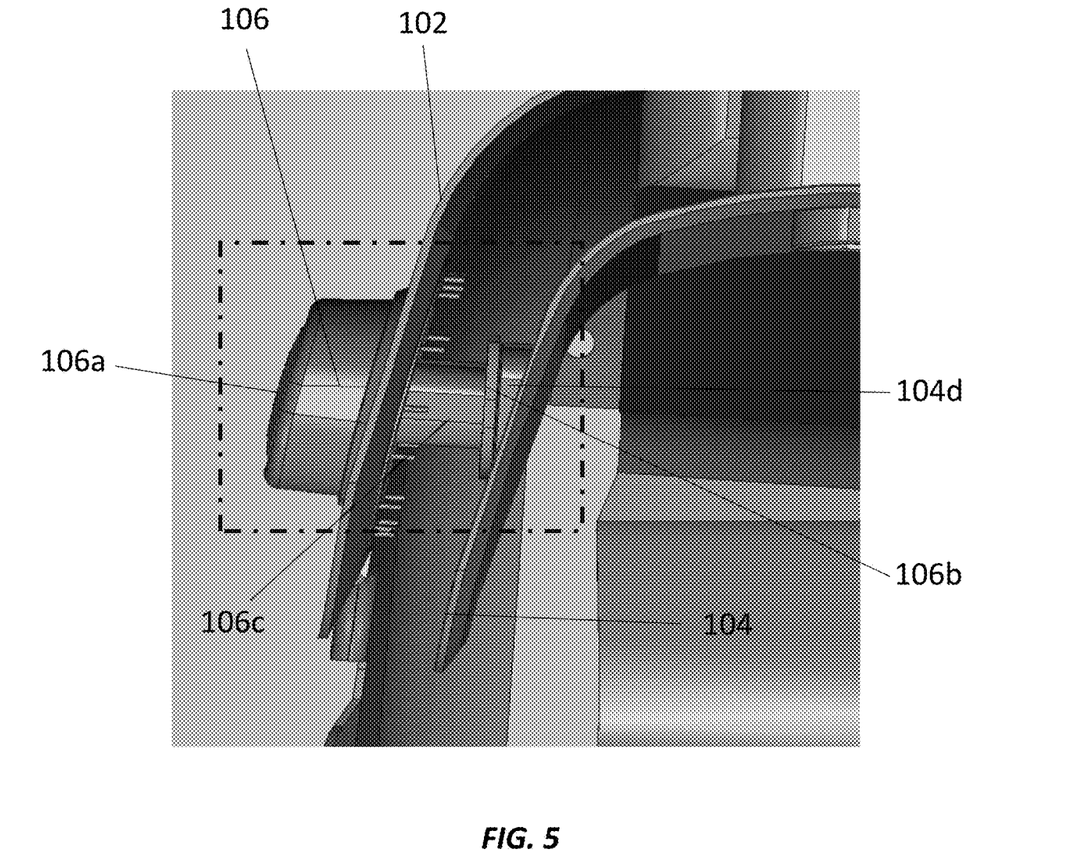
FIG. 5 illustrates an enlarged view of a bumper of a child restraint system, according to one embodiment.

As disclosed herein, the bumper 106 may be of unitary, i.e., single piece, construction that may have substantially constant dimensions along its length and/or width. An embodiment of a single piece bumper is illustrated in FIGS. 3A, 3B, and 4, where the bumper 106 is shown as a rectangular cuboid solid in cross section having substantially constant dimensions along its length and/or width. Alternatively, a single piece bumper 106 may include structural features that vary in dimension. For example, a single piece bumper may include one end, either an inner face or an outer face, that is larger in at least one dimension than a central portion of the bumper 106 positioned within the aperture 103 of shell 102. In some embodiments, a bumper 106 may be constructed from multiple components, such as the bumper illustrated in FIG. 5. With reference to FIG. 5, bumper 106 (highlighted in the dashed line box) includes outer face 106a connected to inner face 106b by shaft 106c. As illustrated, outer face 106a and inner face 106b have at least one dimension larger than that of shaft 106c, with the inner face 106b having a smaller dimension than the outer face 106a. In this configuration, the outer face 106a has the largest surface area of any component of bumper 106, and the larger surface area of the outer face 106a aids in allowing the bumper 106 to translate and direct the inner face 106a into the head support member 104 upon contact during a side impact collision. This is only one possible configuration, and this disclosure is not limited in the size differences between the components of bumper manufactured from more than one component. A bumper 106 manufactured from multiple components may be assembled using techniques known to one of skill in the art, for example, mechanical fastening, e.g., screws or bolts, chemical fastening, e.g., adhesives or solvent welding, and other similar techniques.

In some embodiments, the inner face of bumper 106 may have a size and/or shape that substantially matches or corresponds to a point of contact or zone on the head support member 104. An example of such an embodiment is illustrated in FIG. 5. With reference to FIG. 5, inner face 106b of bumper 106 includes a substantially flat projection. Head support member 104, which as described herein has a generally U-shaped profile, includes a projection 104d having a portion that substantially corresponds to the shape and/or curvature of the head support member 104 fastened thereto and a portion that substantially corresponds to the shape of the projection of inner face 106b. In this configuration, contact between the inner face 106b and the projection 104d of head support member 104 occurs over a region of greater surface area to aid in directing the head support member 104 into the head of a child positioned in the child restraint system 100. In further embodiments, for a head support member 104 that can be adjusted along the vertical axis of the shell 102 as described herein, the projection 104d of head support member 104 may span the full vertical dimension of the head support member 104.

The bumper 106 may be secured to the shell 102 such that it cannot be removed from the shell 102. In some cases, the bumper 106 may be secured to the shell 102 using a tethered connection, such as by one or more pieces of fabric or an elastomeric material fastened to both the bumper 106 and shell 102. Alternatively, or in addition, the bumper 106 may be secured to the shell 102 by using the relative differences in size between one or more components of the bumper 106 and the aperture 103 of the shell 102, e.g., by an interference or friction fit. As described herein, and as illustrated in FIG. 5, the outer face 106a and inner face 106b may have at least one dimension larger than the aperture through the shell 102. As a non-limiting example, one or both of the outer face 106a and inner face 106b may be formed into a shape having a dimension larger than the aperture by any suitable method, such as heat staking, to form a face greater than the aperture dimension for securing the bumper to the shell. Thus, the bumper 106 cannot be removed from the shell 102 as neither the outer face 106a or inner face 106b can pass through the aperture.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only. Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A child restraint system, comprising:
a shell including an upper portion and a lower portion, the upper portion having an aperture formed therein;
a head support member disposed within at least a part of the upper portion; and
a bumper extending through the aperture in the upper portion and configured to contact a part of the head support member.

2. The system of claim 1, wherein the bumper embodies a rectangular-shaped cuboid in cross section.

3. The system of claim 1, wherein the bumper includes a rigid material, a resilient material, a plastically deformable material, or a combination thereof.

4. The system of claim 1, wherein the bumper has a length of about 3 inches to about 5 inches.

5. The system of claim 1, wherein the bumper is secured to the shell of the child restraint system.

6. The system of claim 5, wherein the bumper is secured to the shell by a component having at least one dimension greater than a dimension of the aperture of the shell.

7. The system of claim 5, wherein the bumper is secured to the shell using a tether.

8. The system of claim 1, wherein the bumper comprises an inner face and an outer face, wherein the inner face extends beyond an inner surface of the shell and the outer face extends beyond an outer surface of the shell.

9. The system of claim 8, wherein the inner face and the outer face of the bumper are connected by a shaft extending through the aperture.

10. The system of claim 8, wherein the inner face of the bumper comprises at least one linear dimension greater than the aperture of the shell.

11. The system of claim 8, wherein the inner face of the bumper protrudes about 0.5 inches to about 3 inches from the inner surface of the shell.

12. The system of claim 8, wherein the inner face of the bumper is no more than about 0.2 inches from the head support member.

13. The system of claim 8, wherein the outer face of the bumper protrudes about 1 inch to about 3 inches from the outer surface of the shell.

14. The system of claim 8, wherein the inner face of the bumper is not in contact with the portion of the head support member.

15. The system of claim 8, wherein the bumper is configured to translate within the aperture of the shell to allow the inner face of the bumper to contact the head support member.

16. The system of claim 8, wherein the head support member includes wings disposed on opposing sides of a central portion, the wings having a front zone, a center zone, and a rear zone.

17. The system of claim 16, wherein the inner face of the bumper is positioned to contact the front zone of one wing of the head support member.

18. The system of claim 16, wherein the inner face of the bumper is positioned to contact the center zone of one wing of the head support member.

19. The system of claim 16, wherein the inner face of the bumper is positioned to contact the rear zone of one wing of the head support member.

20. The system of claim 16, wherein the zone of the wing contactable by the inner face of the bumper comprises a projection that substantially matches a profile of the inner face of the bumper.

* * * * *